(12) United States Patent
Sato et al.

(10) Patent No.: US 7,557,978 B2
(45) Date of Patent: Jul. 7, 2009

(54) OPTICAL ELEMENT

(75) Inventors: Keisuke Sato, Kawasaki (JP); Masao Kondo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/062,591

(22) Filed: Feb. 23, 2005

(65) Prior Publication Data

US 2006/0092498 A1    May 4, 2006

(30) Foreign Application Priority Data

Nov. 2, 2004    (JP)    ............... 2004-319439

(51) Int. Cl.
*G02F 1/03*    (2006.01)
*G02F 1/295*    (2006.01)

(52) U.S. Cl. .......................... 359/254; 385/8

(58) Field of Classification Search ................ 359/245, 359/251, 252, 254, 321–323; 385/2, 8
See application file for complete search history.

(56) References Cited

U.S. PATENT DOCUMENTS

| | | | | |
|---|---|---|---|---|
| 5,070,026 A | * | 12/1991 | Greenwald et al. | ............. 438/3 |
| 5,198,269 A | * | 3/1993 | Swartz et al. | ............. 427/226 |
| 6,162,293 A | * | 12/2000 | Kijima et al. | ............. 117/104 |
| 6,385,355 B1 | * | 5/2002 | Nashimoto et al. | ............. 385/8 |
| 2003/0108264 A1 | | 6/2003 | Nishizawa et al. | |
| 2005/0175281 A1 | * | 8/2005 | Thapliya et al. | ............. 385/28 |

FOREIGN PATENT DOCUMENTS

| | | |
|---|---|---|
| JP | 06-067130 | 3/1994 |
| JP | 2001-117059 | 4/2001 |
| JP | 2001-249311 | 9/2001 |

OTHER PUBLICATIONS

Ishii Masatoshi et al; The 51$^{st}$ Spring Meeting 2004; The Japan Society of Applied Physics and Related Societies, 29p-ZL-1) Mar. 2004; see page 3 specification.
Shintaro Yokoyama et al; "Large piezoelectric response in (111)-oriented epitaxial Pb(Zr,Ti)O$_3$ films consisting of mixed phases with rhombohedral and tetragonal symmetry"; Applied Physics Letter; vol. 83, No. 12; Sep. 22, 2003; pp. 2408-2410.
Kirkby; "Electrostriction and Strain-optic Phenomena in PLZT Sep. 25, 1935", Ferroelectrics, (1981) vol. 37, pp. 567-570.

* cited by examiner

*Primary Examiner*—William C Choi
(74) *Attorney, Agent, or Firm*—Kratz, Quintos & Hanson, LLP.

(57) ABSTRACT

An optical waveguide is formed of a stack of electro-optic effect films. A stress-relief layer is formed between a substrate and the optical waveguide. The stress-relief layer is comprised of a metal material having a thermal expansion coefficient of $10 \times 10^{-6}/°$ C. or higher, for example, a metal material whose major component is one of Au, Ag, and an alloy thereof, and has a function of relieving a binding force to the optical waveguide ascribable to the substrate.

8 Claims, 5 Drawing Sheets

OPTICAL ELEMENT

CROSS-REFERENCE TO RELATED APPLICATIONS

This application is based upon and claims the benefit of priority from the prior Japanese Patent Application No. 2004-319439, filed on Nov. 2, 2004, the entire contents of which are incorporated herein by reference.

BACKGROUND OF THE INVENTION

1. Field of the Invention

The present invention relates to an optical element used in a technical field of optical communication, optical signal processing, and the like.

2. Description of the Related Art

Applying an electric field to a dielectric crystal or a ferroelectric crystal causes a change in refractive index. This phenomenon is called an electro-optic effect. This effect is utilized for developing various optical elements such as an optical modulator, a light deflector, and an optical switch.

Here, assuming that an electric field E is applied in parallel with TM-Mode of light propagating in a crystal. Changes in refractive indexes of a TE-Mode and a TM-Mode at this time are expressed as follows respectively.

$$\Delta n_{TE} = -(1/2) n_{TE}^3 r_{13} E \quad (1)$$

$$\Delta n_{TM} = -(1/2) n_{TM}^3 r_{33} E \quad (2)$$

$n_{TE}$ and $n_{TM}$ represent refractive indexes of the TE-Mode and the TM-Mode, and $r_{13}$ and $r_{33}$ represent electro-optic constants thereof, respectively. Variation amounts $\Delta n_{TE}$, $\Delta n_{TM}$ of the refractive indexes are proportional to voltage intensity, electro-optic constant, and refractive index cubed. Using a material high in electro-optic effect to form an optical waveguide in an optical element, for example, a light deflector can result in a large-angle light deflection even with a low voltage. Therefore, the use of a material high in electro-optic constant and in refractive index is under consideration in various kinds of optical elements.

[Patent document 1] Japanese Patent Application Laid-open No. 2003-177262

[Patent document 2] Japanese Patent Application Laid-open No. 2001-117059

[Patent document 3] Japanese Patent Application Laid-open No. 2001-249311

[Patent document 4] Japanese Patent Application Laid-open No. Hei 6-67130

An electro-optic effect $r_c$ generally used as a characteristic of a so-called bulk electro-optic material or the like is represented by the following expression.

$$r_c = r_{33} - (n_{TE}/n_{TM})^3 r_{13} \quad (3)$$

In a bulk $(Pb_{1-y}La_{(3/2)y})(Zr_{1-x}Ti_x)O_3$, which is so-called PLZT (8/65/35), a large value $r_c = 500$ pm/V is recorded.

Characteristics of thin-film PLZT, for example, an epitaxial film of PLZT formed by epitaxial growth have been reported (Ishii Masatoshi et. al.: The 51st Spring Meeting 2004 (The Japan Society of Applied Physics and Related Societies, 29p-ZL-1)). This paper discusses characteristics that are obtained when PLZT is used as a material to form an epitaxial film with {010} crystal orientation on a major growth face. Here, it is reported that $r_{13}$ and $r_{33} = 30$ pm/V to 40 pm/V, and $r_c = 0$ pm/V. Thus, while bulk PLZT exhibits a high electro-optic effect, thin-film PLZT is significantly inferior in electro-optic effect compared with a bulk PLZT.

In recent years, a more miniaturized and higher-performance optical element is being demanded, and in order to respond to this demand, the use of a thin-film electro-optic material is essential. However, at present, no suitable measure has been found for applying a thin-film electro-optic material to an optical element as described above, and it is now groped for.

SUMMARY OF THE INVENTION

The present invention is made in consideration of the problems stated above, and it is an object of the present invention to provide a high-reliability optical element having a thin electro-optic effect film which exhibits a high electro-optic effect equivalent to that of a bulk electro-optic effect material so as to fully satisfy a demand for further miniaturization and higher performance.

An optical element of the present invention includes: at least one layer of an electro-optic effect film formed above a substrate and having an electro-optic effect; and a high thermal expansivity film formed between the substrate and the electro-optic effect film and comprised of metal with a thermal expansion coefficient of $10 \times 10^{-6}/°$ C. or higher.

Another optical element of the present invention includes: at least one layer of an electro-optic effect film formed above a substrate and having an electro-optic effect; and a high-electrostriction film formed between the substrate and the electro-optic effect film and comprised of a material that is larger in electrostrictive constant than the substrate.

DETAILED DESCRIPTION OF THE PREFERRED EMBODIMENTS

-Basic Gist of Present Invention-

Figure 1:
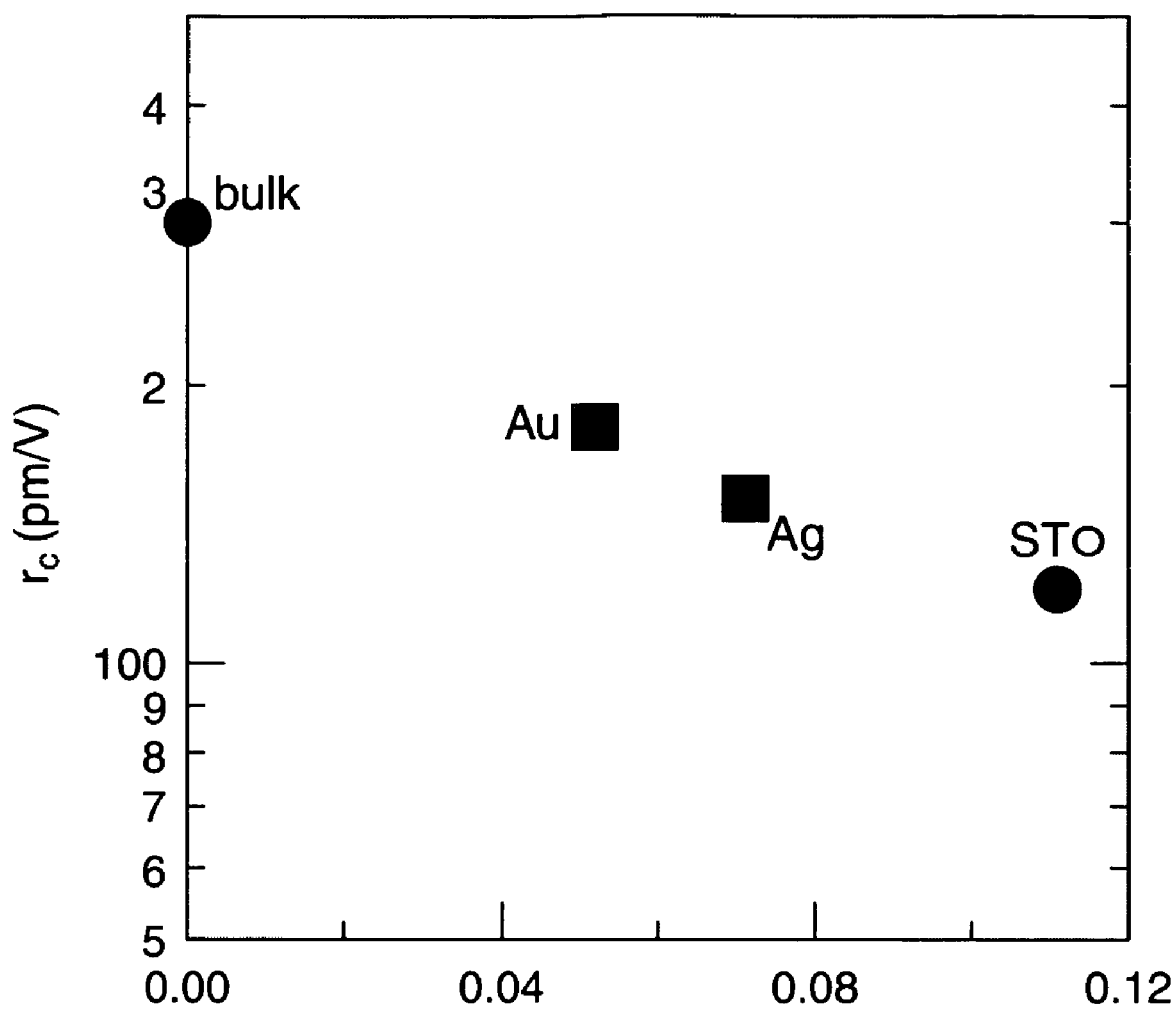
FIG. 1 is a characteristic chart showing the result of a study on the correlation between an electro-optic effect $r_c$ (pm/V) of an electro-optic effect film and a thermal expansion coefficient ($/°$ C.) of a stress-relief film.

The present inventors formed an epitaxial film of PLZT with {111} crystal orientation on a major growth face and studied characteristics thereof. The results were as follows: $r_{13} = -10$ pm/V, $r_{33} = 110$ pm/V, $r_c = 120$ pm/V. Its behavior was closer to that of bulk PLZT than to that of an epitaxial film with {001} crystal orientation. However, its electro-optic effect is still lower than $r_c = 500$ pm/V of bulk PLZT.

Generally, an electro-optic effect includes an effect by polarization and an effect by distortion. Among all, PLZT has a large effect by distortion, and it has been reported that the effect by distortion is as large as 60% of the whole electro-optic effect (C. J. Kirkby, Ferroelectrics, 37 567 1981). In consideration of this fact, the present inventors studied to what extent the ratio of the effect by distortion is in the electro-optic effect of the epitaxial film of PLZT.

First, an electro-optic effect is estimated from a distortion amount caused by the application of an electric field to the epitaxial film of PLZT. A refractive index is substantially proportional to density ($\rho=V/M$ ($\rho$: density, V: volume, M: mass)), so that density changes in proportion to the distortion amount caused by an application direction of the electric field.

The following formula holds, where $n_0$ and $V_0$ are a refractive index and volume before the application of the electric field and n and V are a refractive index and volume after the application of the electric field.

$$n_0 V_0 = nV \quad (4)$$

Calculation of an electro-optic constant using this formula will give $$n - n_0 = -(1/2)n_0^3 r_{33} E \quad (5)$$

Here, $r_{33}$ represents the electro-optic constant in a direction parallel with the electric field and E represents the electric field.

Then, on the epitaxial film actually formed, a value of $r_{33}$ calculated by using the formula (5) is compared with a measured value of the electro-optic constant.

Here, an epitaxial film of PZT with {001} crystal orientation is used. As a result, the calculated value and the measured value were both 23 pm/V. In the calculation, data on the distortion amount was cited from a document (Shintaro Yokoyama et. al.: Appl. Phys. Letter 83 (2003) 2408). For reference, calculated values on epitaxial films of PLZT with {001} and {111} crystal orientations respectively are 38 pm/V and 112 pm/V, and a measured value on an epitaxial film of PZT with {111} crystal orientation was 121 pm/V to 231 pm/V.

It was thus confirmed that the calculated value substantially matches the measured value. From the above results, it is understood that the electro-optic constant of an epitaxial film can be substantially accounted for only by the influence of the distortion. The present inventors noted this fact and have come up with an idea of improving an electro-optic effect of an electro-optic effect film by relieving a binding force to the electro-optic effect film ascribable to a substrate when the electro-optic effect film such as the aforesaid epitaxial film is formed on the substrate.

As concrete structures for relieving the binding force to the electro-optic effect film ascribable to the substrate, the following two structures will be proposed in the present invention.

(1) to form, between the substrate and the electro-optic effect film, a stress-relief film with a high thermal expansion coefficient (high thermal expansivity film) comprised of metal with a thermal expansion coefficient of $10 \times 10^{-6}/°$ C.

(2) to form, between the substrate and the electro-optic effect film, a stress-relief film with a large electrostrictive constant (high-electrostriction film) comprised of a material larger in electrostrictive constant than the substrate Regarding the Structure of (1)

As the stress-relief film applied to the present invention, a thin film with a high thermal expansion coefficient (high thermal expansivity film) is conceivable. In this case, from the viewpoint of a high thermal expansion coefficient and easiness, reliability, and so on of the film growth, and in consideration that electrodes (an upper electrode and a lower electrode) are disposed on an upper and a lower side of the electro-optic effect film respectively, the high thermal expansivity film (this expression is used here) also functions as the lower electrode. Further, from the viewpoint of realizing a miniaturized element and reduced manufacturing processes, the stress-relief film is formed by using a metal material, in particular, a metal material whose major component is gold (Au), silver (Ag), an alloy thereof, or the like.

FIG. 1 is a characteristic chart showing the result of a study on the correlation between the electro-optic effect $r_c$ (pm/V) of an electro-optic effect film and a thermal expansion coefficient (/° C.) of a stress-relief film. In FIG. 1, the reciprocal (° C.) of the thermal expansion coefficient is taken on the horizontal axis and $r_c$ (pm/V) is taken on the vertical axis.

As is seen, the larger the thermal expansion coefficient is, the larger the value $r_c$ is. It is seen that both for Au (thermal expansion coefficient: $19.2 \times 10^{-6}/°$ C.) and Ag (thermal expansion coefficient: $14.1 \times 10^{-6}/°$ C.), $r_c$ is larger than that for SrTiO$_3$ (STO) which is in wide use as a substrate material of an optical element, and $r_c$ close to that of a bulk electro-optic material (here, 500 pm/V) is obtained.

A stress-relief film was actually formed by using Au or Ag as its material, and $r_c$ was measured on an epitaxial film as an electro-optic effect film with {111} crystal orientation on a major growth face, which is comprised of PLZ. As a result, $r_c$ was as large as about 200 pm/V. This value indicates a great improvement from $r_c=120$ pm/V which is a value obtained when the stress-relief film is not formed.

Regarding the Structure of (2)

In (1), a metal film was used as the stress-relief film, but an insulation film will be presented as the stress-relief film applied to the present invention here. Since the present invention aims at relieving a bonding force to an electro-optic effect film ascribable to a substrate, a stress-relief film is formed using a material larger in electrostrictive constant (high-electrostriction film) than the substrate. In a case where STO is used as a material of the substrate, as is often the case in a practical substrate as described above, a concrete material used for the stress-relief film is a material larger in electrostrictive constant than STO, for example, a material whose major component is PbMg$_{0.5}$W$_{0.5}$O$_3$ or KTaO$_3$. Here, the electrostrictive constants of STO, PbMg$_{0.5}$W$_{0.5}$O$_3$, and KTaO$_3$ are $4.7 \times 10^{-2}$ m$^4$/C$^2$, $6.2 \times 10^{-2}$ m$^4$/C$^2$, $5.2 \times 10^{-2}$ m$^4$/C$^2$, respectively.

In this case, the lower electrode is formed between the substrate and the high-electrostriction film (this expression is used here). This structure is adopted, considering the fact that, if the lower electrode is formed between the stress-relief film and the electro-optic effect film, the effect of relieving the bonding force of the substrate by the stress-relief film is inhibited. Unnecessary substance formed between the stress-relief film and the electrostatic effect film is preferably reduced to the minimum.

Actually, STO was used as a material of a substrate and a stress-relief film was formed using PbMg$_{0.5}$W$_{0.5}$O$_3$ or KTaO$_3$ as its material. Then, $r_c$ was measured on an epitaxial film as an electro-optic effect film with {111} crystal orientation on a major growth face, which is comprised of PLZT. The result showed that $r_c$ was as large as about 220 pm/V. This value indicates a great improvement from $r_c=120$ pm which is a value obtained when the stress-relief film is not formed.

Each of the patent documents 1 to 4 discloses that a buffer film is formed between a substrate and an electro-optic effect film, but any of them teaches a viewpoint of thermal expansion coefficient or a viewpoint of an electrostrictive constant as are considered in the present invention. Therefore, the quality and material of the buffer film are completely different from those of the present invention.

-Various Concrete Embodiments to which Present Invention is Applied-

Hereinafter, various concrete embodiments to which the present invention is applied will be detailed with reference to the drawings.

First Embodiment

This embodiment will disclose an example where the present invention is applied to a light deflector which is an optical element. The light deflector is an optical element that deflects incident light at a desired angle to output the deflected light.

Figure 2A:
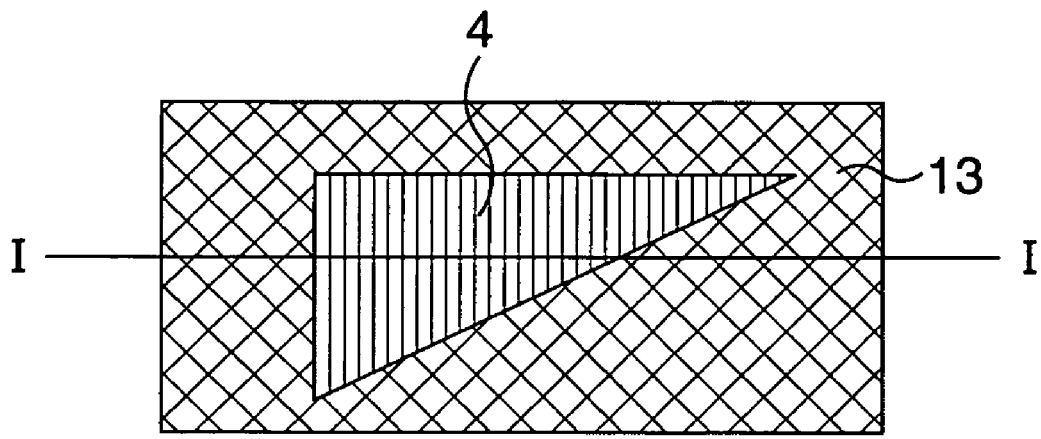
FIG. 2A and FIG. 2B are schematic views showing an essential structure of a light deflector according to a first embodiment.
Figure 2B:
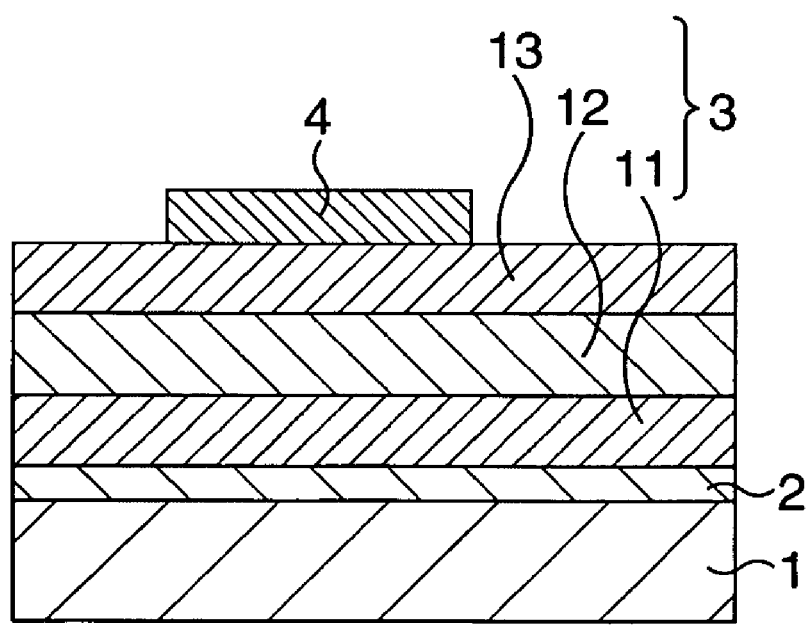

FIG. 2A and FIG. 2B are schematic views showing an essential structure of the light deflector according to the first embodiment. FIG. 1A is a plane view and FIG. 1B is a cross-sectional view taken along the I-I line in FIG. 1A.

This light deflector includes: a stress-relief layer 2 comprised of a metal material and formed on a substrate 1; an optical waveguide 3 composed of electro-optic materials layered on the stress-relief layer 2; and a deflection electrode 4 provided on the optical waveguide 3 to face the stress-relief layer 2 via the optical waveguide 3.

The substrate 1 includes as its major component an insulative material, here $SrTiO_3$ (STO), and for example, STO containing 1% Nb is used.

The optical waveguide 3, which is a so-called slab waveguide, is formed of a stack of two layers or more, here, three layers of electro-optic effect films. Specifically, the optical waveguide 3 is structured such that a lower clad layer 11 and an upper clad layer 13 sandwich a core layer 12 in which an optical path is formed. Preferably, an electro-optic material of the optical waveguide 3 contains one kind selected from, for example, the following materials, each of which is a ferroelectric material superior in electro-optic effect and has, for example, a simple perovskite structure: $Pb(Zr_{1-x}Ti_x)O_3$ (PZT: $0 \leq x \leq 1$), $(Pb_{1-y}La_{(3/2)y})(Zr_{1-x}Ti_x)O_3$ (PLZT: $0 \leq x$, $y \leq 1$), $Pb(B'_{1/3}B''_{2/3})_xTi_yZr_{1-x-y}O_3$ ($0 \leq x$, $y \leq 1$, B' is bivalent transitional metal, B'' is pentavalent transitional metal), $Pb(B'_{1/2}B''_{2/2})_xTi_yZr_{1-x-y}O_3$ ($0 \leq x$, $y \leq 1$, B' is bivalent transitional metal, B'' is pentavalent transitional metal), and $Pb(B'_{1/3}B''_{2/3})_xTi_yZr_{1-x-y}O_3$ ($0 \leq x$, $y \leq 1$, B' is hexavalent transitional metal, B'' is trivalent transitional metal). Here, each of the electro-optic effect films of the optical waveguide 3 is an epitaxial film formed by epitaxial growth and has, for example, {100} crystal orientation on a major growth face.

Also suitably used is an electro-optic material with a tungsten bronze structure containing one kind selected from, for example, $(Sr_{1-x}Ba_x)Nb_2O_6$ ($0 \leq x \leq 1$) $(Sr_{1-x}Ba_x)Ta_2O_6$ ($0 \leq x \leq 1$), $PbNb_2O_6$, and $Ba_2NaNb_5O_{15}$. Also suitably used is an electro-optic material with a bismuth-layered structure containing one kind selected from, for example, $(Bi_{1-x}R_x)Ti_3O_{12}$ (R is a rare-earth element: $0 \leq x \leq 1$), $SrBi_2Ta_2O_9$, and $SrBi_4Ti_4O_{15}$. A material with a desired refractive index is selected from these materials and is used as the material of the optical waveguide 3.

The stress-relief layer 2 is comprised of a metal material whose thermal expansion coefficient is $10 \times 10^{-6}/°$ C. or larger, for example, a metal material whose major component is Au, Ag, or an alloy thereof. The stress-relief layer 2 has a function of relieving a bonding force to the optical waveguide 3 ascribable to the substrate 1. The formation of the stress-relief layer 2 causes the optical waveguide 3 to have a high electro-optic effect, for example, $r_c$=about 200 pm/V. Since this stress-relief layer 2 is a high-conductivity metal material, it also functions as a lower electrode for use when a voltage is applied to the optical waveguide 3.

The deflection electrode 4 is in a triangular shape, facing the stress-relief layer 2 via the optical waveguide 3, and it has a function of deflecting incident light at a desired angle to output the deflected light when a predetermined voltage is applied.

Here, a manufacturing method of the light deflector according to this embodiment will be described.

Figure 3A:
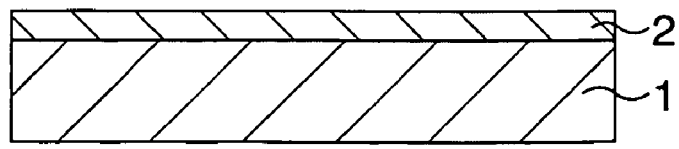
FIG. 3A, FIG. 3B, and FIG. 3C are schematic cross-sectional views showing a manufacturing method of the light deflector according to the first embodiment, in the order of processes.
Figure 3B:
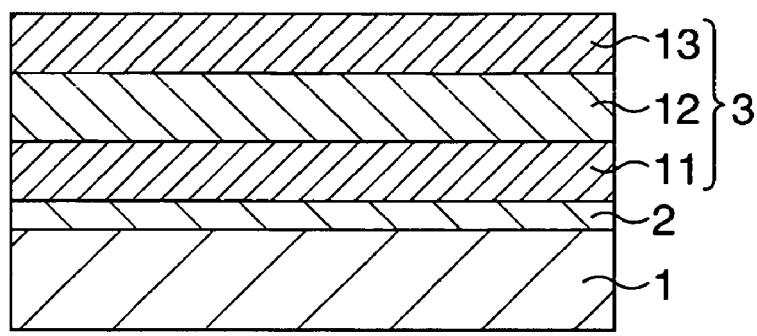
Figure 3C:
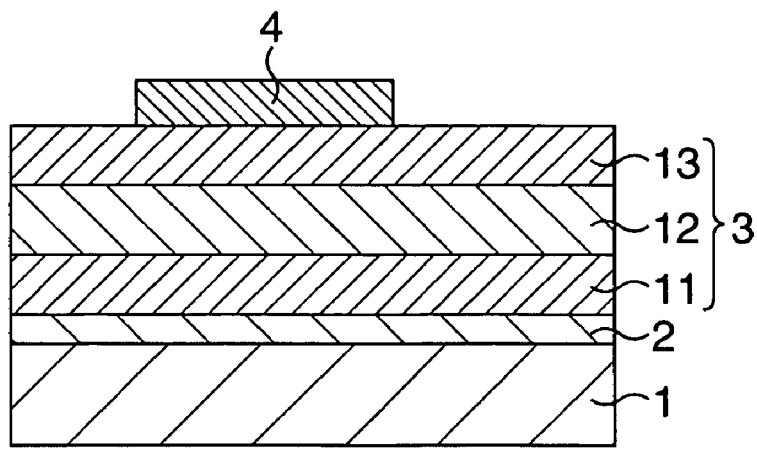

FIG. 3A, FIG. 3B, and FIG. 3C are schematic cross-sectional views showing the manufacturing method of the light deflector according to the first embodiment, in the order of processes.

First, the stress-relief layer 2 is formed on the substrate 1.

Specifically, as shown in FIG. 3A, a metal material whose major component is, for example, Au, Ag, or an alloy thereof, here, Ag is deposited by sputtering on the substrate 1 with {100} crystal orientation on a major growth face, comprised of Nb1%-STO, thereby forming the stress-relief layer 2 with a film thickness of about 100 nm.

Subsequently, the optical waveguide 3 is formed on the stress-relief layer 2.

First, a sol-gel solution (precursor) for PLZT is prepared. The sol-gel solution for PLZT is synthesized under reflux of organic compounds of constituent metal elements and a stabilizer by a solvent: the organic compounds being $Pb(CH_3COO)_2 \cdot 3H_2O$ [lead acetate], $La(i-OC_3H_7)_3$ [lanthanum isopropoxide] $Ti(i-OC_3H_7)_4$ [titanium isopropoxide], and $Zr(OC_3H_7)_4$ [zirconium propoxide]; the stabilizer being $CH_3COCH_2COCH_3$ [2,4-pentanedione]; and the solvent being $CH_3OC_2H_4OH$ [2-methoxyethanol]. For preparing a (8/65/35) composition of PLZT, a mol ratio of $Pb(CH_3COO)_2 \cdot 3H_2O/La(i-OC_3H_7)_3$ is set to 102/8 and a mol ratio of $Zr(Oc_3H_7)_4/Ti(i-OC_3H_7)_4$ is set to 65/35.

The sol-gel solution prepared by the above-described manner is used to epitaxially grow the lower clad layer 11, the core layer 12, and the upper clad layer 13 different in refractive index as shown in FIG. 3B.

Specifically, the sol-gel solution with the PLZT (11/65/35) composition is applied on the stress-relief layer 2 by spin coating. Subsequently, the substrate 1 coated with the sol-gel solution is baked on a hotplate, for example, at 140° C. for five minutes and at 350° C. for five minutes. Subsequently, an infrared furnace is used to sinter the workpiece at 700° C. in an oxygen atmosphere. Through the foregoing processes, an electro-optic effect film with a film thickness of about 100 nm to about 200 nm is formed. These processes are repeated to form the lower clad layer 11 with a film thickness of, for example, about 3 μm.

Subsequently, a sol-gel precursor of PLZT (8/65/35) is applied on the lower clad layer 11 in the same manner to form the core layer 12 with a film thickness of, for example, about 4 μm.

Then, a sol-gel precursor of PLZT (11/65/35) is applied on the core layer 12 in the same manner to form the upper clad layer 13 with a film thickness of, for example, about 3 μm.

The refractive index of the lower and upper clad layers 11, 13 with the PLZT (11/65/35) composition is 2.39 for a 1.55 μm wavelength. Further, the refractive index of the core layer 12 with the PLZT (8/65/35) composition is 2.40 for a 1.55 μm wavelength.

Subsequently, the deflection electrode 4 is formed on the upper clad layer 13.

Specifically, as shown in FIG. 3C, for example, a Cu/W film is mask-deposited in a triangular shape on the upper clad layer 13 to form the deflection electrode 4.

Through the foregoing processes, the light deflector of this embodiment is completed.

As described above, according to this embodiment, the stress-relief layer 2 is formed between the substrate 1 and the optical waveguide 3, so that a high electro-optic effect equivalent to that of a bulk electro-optic effect material occurs in the optical waveguide 3 formed of electro-optic effect films, thereby realizing a high-reliability light deflector fully responding to a demand for further miniaturization and higher performance.

Second Embodiment

Next, a second embodiment of the present invention will be described. Similarly to the first embodiment, this embodiment will disclose an example where the present invention is applied to a light deflector as an optical element, but this embodiment is different in a stress-relief layer and so on. The same reference numerals or symbols are used to designate the same constituent members and the like as those of the light deflector of the first embodiment.

Figure 4A:
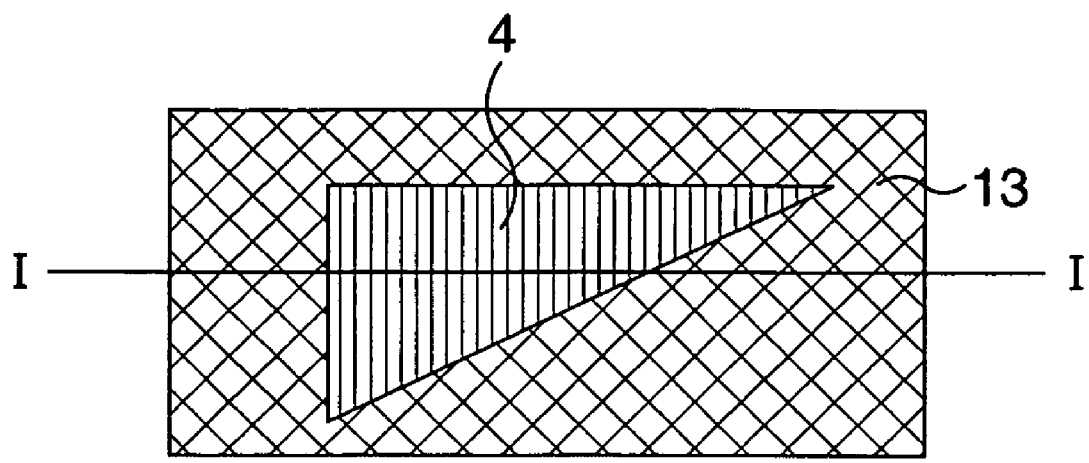
FIG. 4A and FIG. 4B are schematic views showing an essential structure of a light deflector according to a second embodiment.
Figure 4B:
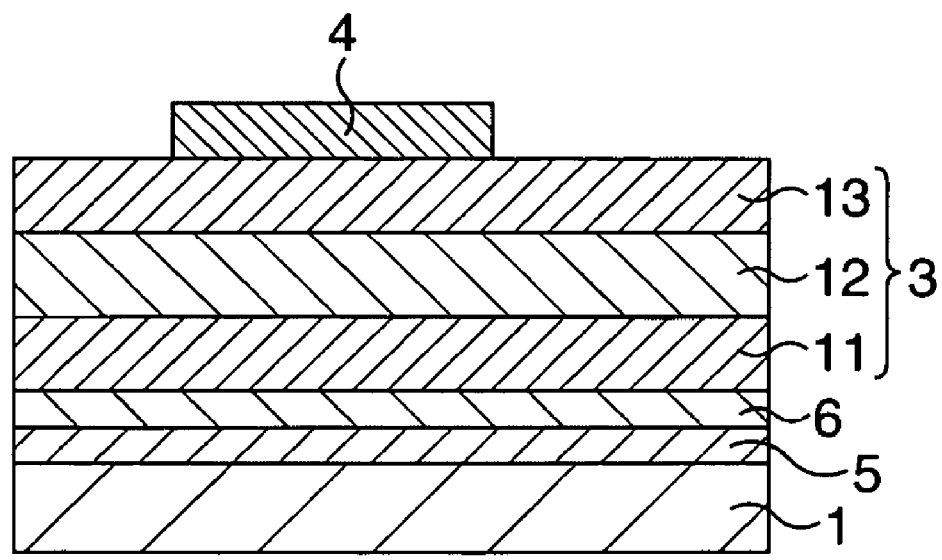

FIG. 4A and FIG. 4B are schematic views showing an essential structure of a light deflector according to the second embodiment. FIG. 4A is a plane view and FIG. 4B is a cross-sectional view taken along the I-I line in FIG. 4A.

This light deflector includes: a lower electrode 5 formed on a substrate 1; a stress-relief layer 6 comprised of an insulative material; an optical waveguide 3 composed of electro-optic materials layered on the stress-relief layer 6; and a deflection electrode 4 provided on the optical waveguide 3 to face the stress-relief layer 6 via the optical waveguide 3.

Here, the constituent materials, forms, formation positions, and so on of the substrate 1, the optical waveguide 3, and the deflection electrode 4 are the same as those of the light deflector described in the first embodiment.

The stress-relief layer 6 is comprised of an insulative material larger in electrostrictive constant than the substrate 1. Here, since the substrate 1 includes STO as its major component, an insulative material whose electrostrictive constant is larger than $4.7 \times 10^{-2}$ m$^4$/C$^2$, which is an electrostrictive constant of STO, is used, for example, an insulative material that includes as its major component $PbMg_{0.5}W_{0.5}O_3$ or $KTaO_3$ is used. The stress-relief layer 6 has a function of relieving a bonding force to the optical waveguide 3 ascribable to the substrate 1. Owing to the formation of the stress-relief layer 6, the optical waveguide 3 exhibits a high electro-optic effect, for example, $r_c$=about 220 pm/V.

The lower electrode 5 is formed of at least one layer including as its major component one kind selected from, for example, $SrRuO_3$, $CaRuO_3$, $LaNiO_3$, $(La_xSr_{1-x})CoO_3$ ($0 \leq x \leq 1$), and $(La_xSr_{1-x})MnO_3$ ($0 \leq x \leq 1$). The lower electrode 5 is formed between the substrate 1 and the stress-relief layer 6, so that the stress-relief layer 6 fully relieves the bonding force of the substrate 1 to the optical waveguide 3 without being interfered by the lower electrode 5.

Here, a manufacturing method of the light deflector according to this embodiment will be described.

FIG. 5A to FIG. 5D are schematic cross-sectional views showing the manufacturing method of the light deflector according to the second embodiment, in the order of processes.

First, the lower electrode 5 is formed on the substrate 1.

Figure 5A:
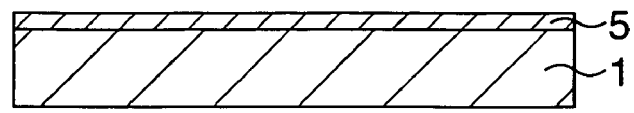
FIG. 5A to FIG. 5D are schematic cross-sectional views showing a manufacturing method of the light deflector according to the second embodiment, in the order of processes.

Specifically, as shown in FIG. 5A, $SrRuO_3$ is deposited by, for example, a PLD method on the substrate 1 with {100} crystal orientation on a major growth face, comprised of Nb1%-STO. Thereafter, a formed $SrRuO_3$ film is subjected to desired patterning, thereby forming the lower electrode 5 with a film thickness of, for example, about 100 nm.

Subsequently, the stress-relief layer 6 is formed on the lower electrode 5.

Figure 5B:
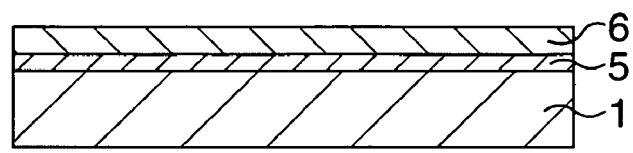
Figure 5C:
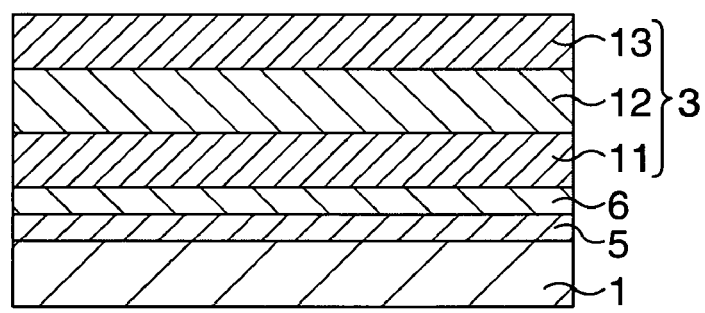
Figure 5D:
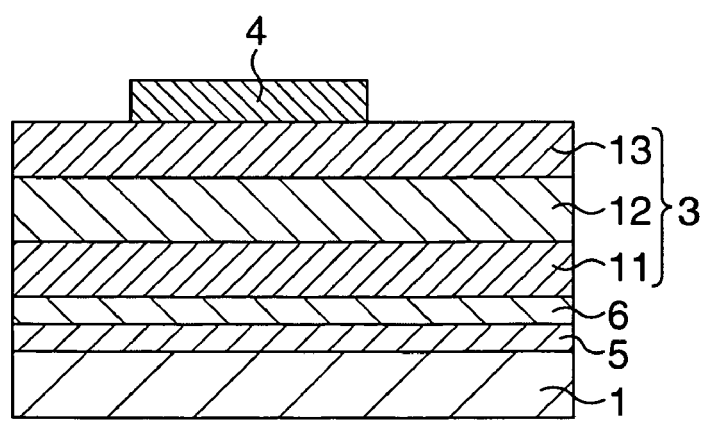

Specifically, as shown in FIG. 5B, by the same sol-gel method as in the first embodiment, a sol-gel solution (precursor) of, for example, $PbMg_{0.5}W_{0.5}O_3$ is prepared. Then, this sol-gel solution is applied on the lower electrode 5, and baking and sintering at a predetermined temperature and for a predetermined time are repeated, thereby forming the stress-relief layer 6 with a film-thickness of, for example, about 100 nm.

Thereafter, by the same sol-gel method as in the first embodiment, the lower clad layer 11, the core layer 12, and the upper clad layer 13 are formed on the stress-relief layer 6 (FIG. 5C), and the deflection electrode 4 is formed on the upper clad layer 13 in the same manner as in the first embodiment, thereby completing the light deflector of this embodiment.

As has been described above, according to this embodiment, owing to the formation of the stress-relief layer 6 between the lower electrode 5 on the substrate 1 and the optical waveguide 3, a high electro-optic effect equivalent to that of a bulk electro-optic effect material occurs in the optical waveguide 3 composed of the electro-optic effect films. Consequently, a high-reliability light deflector fully responding to a demand for further miniaturization and higher performance is realized.

The present invention realizes a high-reliability optical element having a thin electro-optic effect film which exhibits a high electro-optic effect equivalent to that of a bulk electro-optic effect material so as to fully satisfy a demand for further miniaturization and higher performance.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. An optical element comprising:
   at least one layer of an electro-optic effect film formed above a substrate and having an electro-optic effect; and
   a high-electrostriction film formed between the substrate and said electro-optic effect film and comprised of a material larger in electrostrictive constant than the substrate, wherein said high-electrostriction film is comprised of a material whose major component is one of $PbMg_{0.5}W_{0.5}O_3$ and $KTaO_3$.

2. The optical element according to claim 1, further comprising:
   an upper electrode formed on said electro-optic effect film; and
   a lower electrode formed on the substrate to face said upper electrode via said electro-optic effect film and said high-electrostriction film.

3. The optical element according to claim 2, wherein said lower electrode is formed of at least one layer whose major component is one kind selected from $SrRuO_3$, $CaRuO_3$, $LaNiO_3$, $(La_xSr_{1-x})CoO_3$ ($0 \leq x \leq 1$), and $(La_xSr_{1-x})MnO_3$ ($0 \leq x \leq 1$).

4. An optical element comprising:
   at least one layer of an electro-optic effect film formed above a substrate and having an electro-optic effect; and
   a high thermal expansivity film formed between the substrate and said electro-optic effect film and comprised of metal with a thermal expansion coefficient of $10 \times 10^{-6}$/° C. or higher;

wherein at least one layer of said electro-optic effect film has a tungsten bronze structure, and wherein the tungsten bronze structure contains one kind selected from $(Sr_{1-x}Ba_x)Nb_2O_6 (0 \leq x \leq 1)$, $(Sr_{1-x}Ba_x)Ta_2O_6 (0 \leq x \leq 1)$, $PbNb_2O_6$, and $Ba_2NaNb_5O_{15}$.

5. The optical element according to claim 4, wherein said electro-optic effect film is formed by epitaxial growth, and wherein said electro-optic effect film has {100} crystal orientation on a major growth face.

6. An optical element comprising:
at least one layer of an electro-optic effect film formed above a substrate and having an electro-optic effect; and
a high thermal expansivity film formed between the substrate and said electro-optic effect film and comprised of metal with a thermal expansion coefficient of $10 \times 10^{-6}/°$ C. or higher, wherein at least one layer of said electro-optic effect film has a bismuth-layered structure.

7. The optical element according to claim 6, wherein the bismuth-layered structure contains one kind selected from $(Bi_{1-x}R_x)Ti_3O_{12}$ (R is a rare-earth element: $0 \leq x \leq 1$), $SrBi_2Ta_2O_9$, and $SrBi_4Ti_4O_{15}$.

8. The optical element according to claim 6, wherein said electro-optic effect film is formed by epitaxial growth, and wherein said electro-optic effect film has {100} crystal orientation on a major growth face.

* * * * *